May 23, 1939. J. E. OWEN 2,159,671
TRAILER CONSTRUCTION
Filed Sept. 19, 1936  4 Sheets-Sheet 1

James E. Owen, INVENTOR
BY Victor J. Evans & Co.
ATTORNEYS

May 23, 1939.  J. E. OWEN  2,159,671
TRAILER CONSTRUCTION
Filed Sept. 19, 1936    4 Sheets-Sheet 2
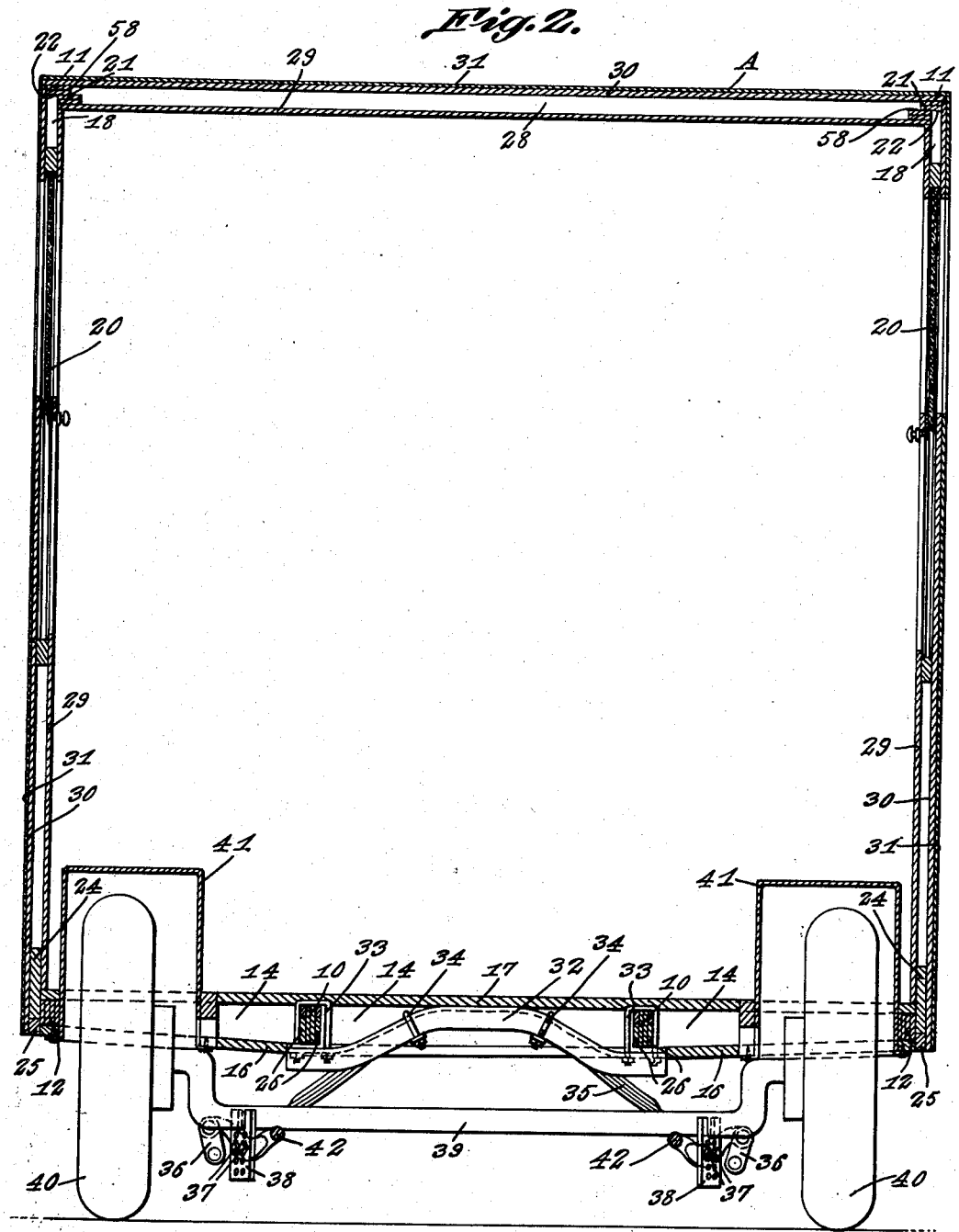

May 23, 1939.   J. E. OWEN   2,159,671
TRAILER CONSTRUCTION
Filed Sept. 19, 1936   4 Sheets-Sheet 3
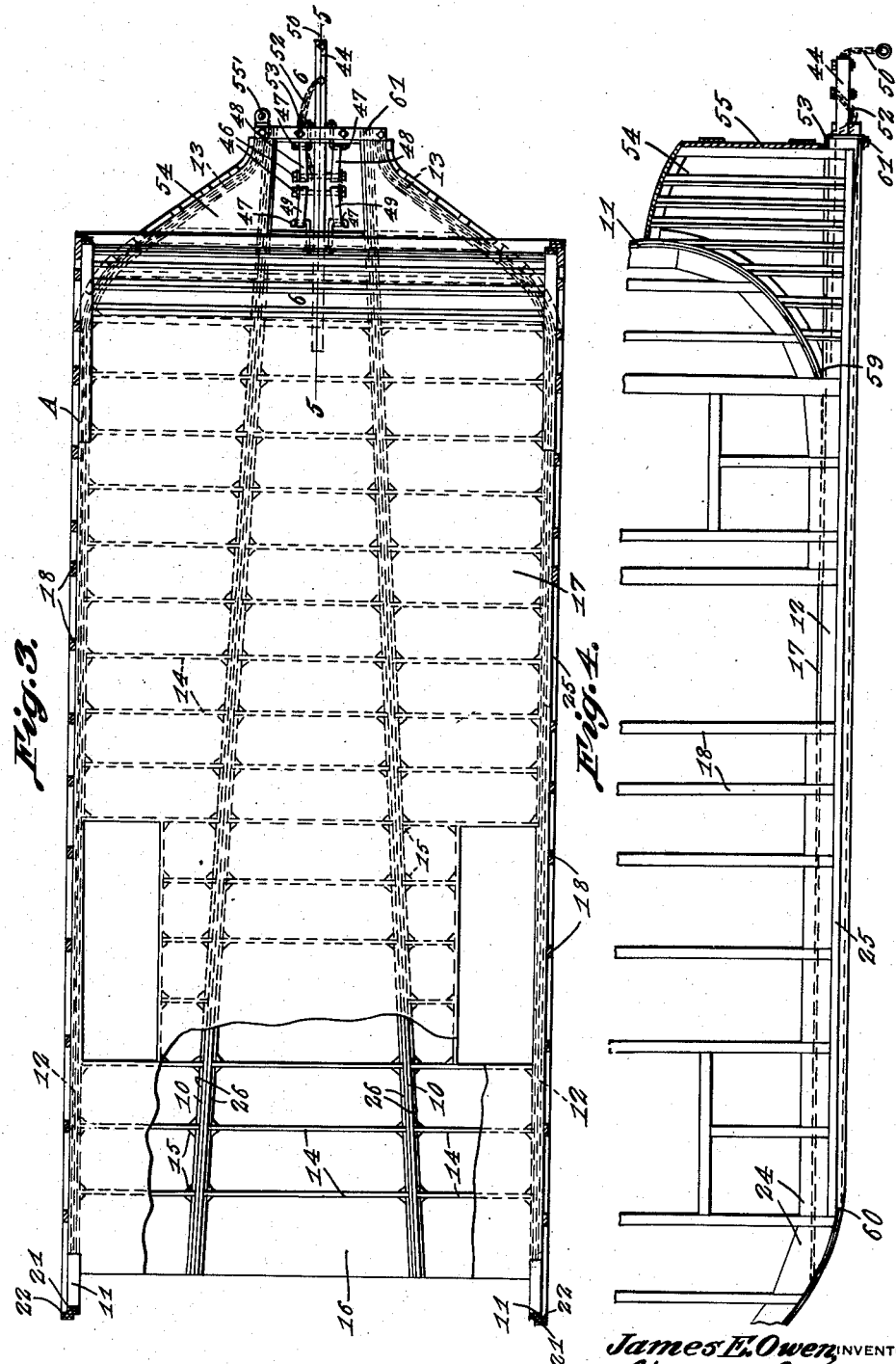

May 23, 1939.  J. E. OWEN  2,159,671
TRAILER CONSTRUCTION
Filed Sept. 19, 1936  4 Sheets-Sheet 4
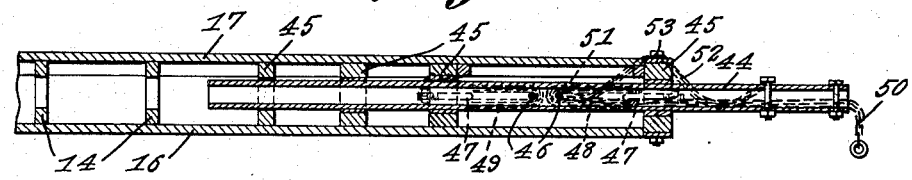
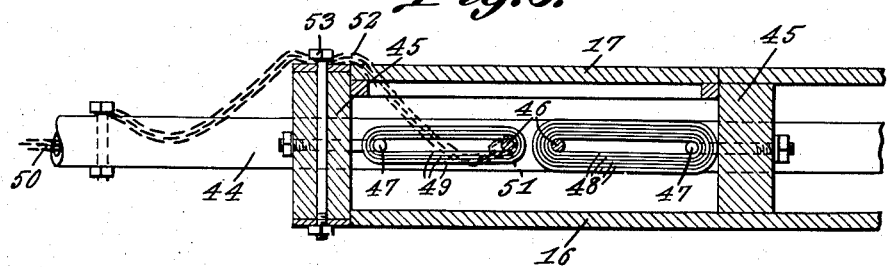
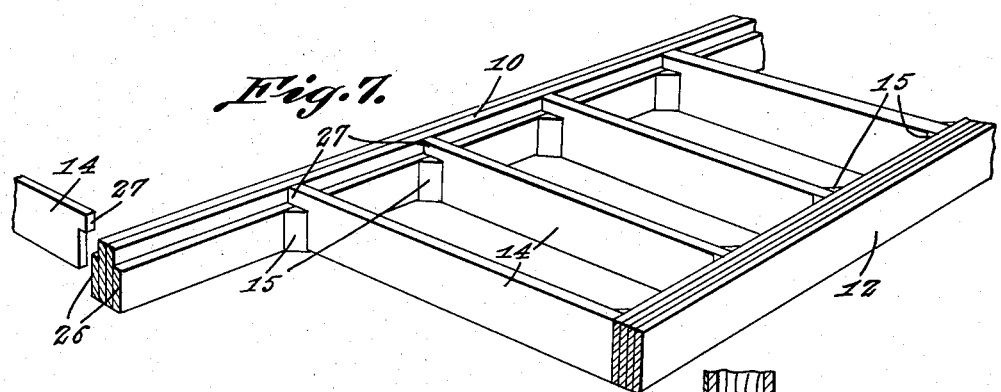
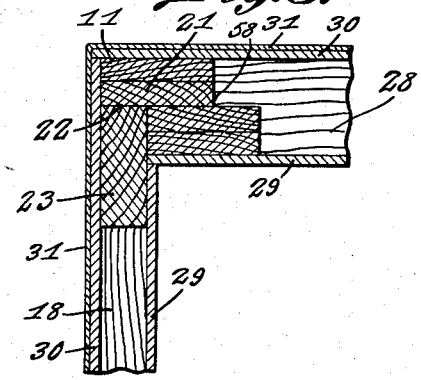
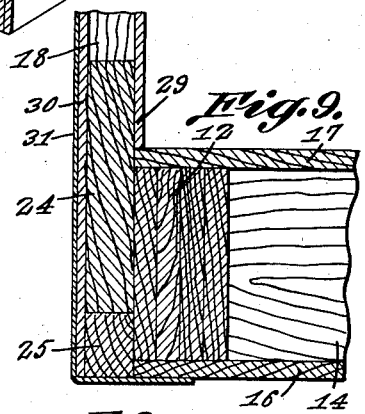
James E. Owen, INVENTOR
BY Victor J. Evans & Co.
ATTORNEYS Patented May 23, 1939

2,159,671

UNITED STATES PATENT OFFICE 2,159,671

TRAILER CONSTRUCTION

James E. Owen, Asheville, N. C.

Application September 19, 1936, Serial No. 101,657

1 Claim. (Cl. 296—28)

The invention relates to a vehicle and more especially to trailer vehicles.

The primary object of the invention is the provision of a vehicle of this character, wherein the entire body thereof is made from laminated or veneered wood with a fabric covering so that such vehicle is rendered light in weight yet possesses strength and durability to withstand hard usage and at the same time avoiding excessive load upon the draft vehicle.

Another object of the invention is the provision of a vehicle of this character, wherein the coupling thereof is had with a draft vehicle in a novel manner in that both a safety coupling chain and check chain are employed in conjunction with a yieldable strap arrangement which absorbs shocks and jars incident to the draft of such vehicle and when the trailer vehicle meets an obstruction in the surface over which the same is traveling.

A further object of the invention is the provision of a vehicle of this character, wherein the body of the same is made up of bows and ribs, these being made from laminated or veneered wood material and the joining of the component parts of the vehicle is had in a novel manner.

A still further object of the invention is the provision of a vehicle of this character, which is simple in its construction, thoroughly reliable and efficient in its operation, strong, durable, yet light in weight, neat in appearance, handy for use by automobilists, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 2 is an enlarged vertical transverse sectional view taken on the line 2—2 of Figure 1.

Figure 3 is a sectional view on the line 3—3 of Figure 1.

Figure 4 is a fragmentary elevation partly in section of the vehicle body.

Figure 5 is a detail sectional view on the line 5—5 of Figure 3.

Figure 6 is a detail sectional view on the line 6—6 of Figure 3.

Figure 7 is a fragmentary exploded perspective view of the base or foundation portion of the body of the vehicle.

Figure 8 is a fragmentary horizontal sectional view through one corner of the body of the vehicle.

Figure 9 is a fragmentary vertical sectional view on an enlarged scale through the body of the vehicle.

Similar reference characters indicate corresponding parts throughout the several views in the drawings.

Figure 1:
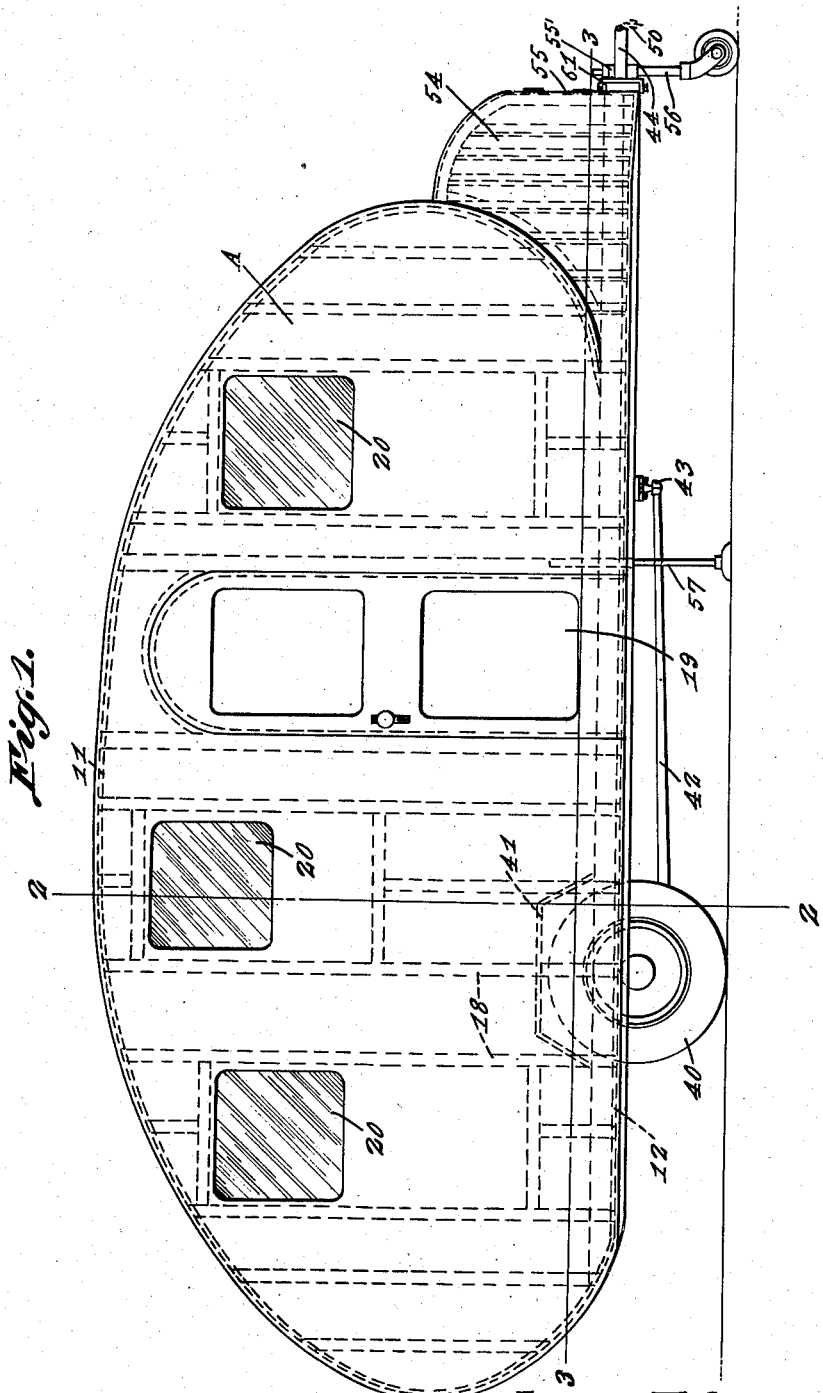
Figure 1 is a side elevation of a vehicle constructed in accordance with the invention.

Referring to the drawings in detail, A designates generally the vehicle body in this instance comprising a foundation or base formation including a pair of spaced rearwardly divergent intermediate sills 10, each made from laminated or veneered wood and extends throughout the length of the body A of such vehicle. At opposite sides of the sills 10 are outer substantially oval shaped side wall bows 11 which likewise are made from laminated or veneered wood which join at their lower portions with outer side sills 12 which at the front of the body are curved inwardly and forwardly at 13 in approaching relation to each other, which likewise are made from laminated or veneered wood and at their forward ends have contact with the forward ends of the intermediate sills 10. Disposed transversely at determined intervals between the intermediate and outer sills 10 and 12 are cross ribs 14 which are suitably joined with the said sills and at the points of juncture are fitted with joint blocks 15 at opposite sides thereof while beneath the said sills and the ribs joined therewith is bottom planking 16 and above the said sills and ribs is a flooring 17, both being made secure to the said sills and ribs in any suitable manner.

The bows have fitted therein spaced vertical studding in the form of ribs 18, these being made from laminated or veneered wood, there being effected window and door openings for accommodating a horizontally swinging door 19 and vertically slidable windows 20, respectively, suitable framing being provided therefor.

Each side bow 11 is composed of two hoops or strips 21 which are laterally offset throughout their extent to provide a seat 22 to accommodate the studding or ribs 18 and also to accommodate the upper filler blocks 23 while lower filler blocks 24 rest upon a spacing strip 25 at each side of the body and outside of the outer sill 12. The intermediate sills 10 have at opposite sides thereof rest stripping 26 to provide seats for the innermost ends 27 of the cross ribs 14 while the outer ends of these ribs abut and are suitably fastened flush against the outer sills 12. The intermediate run of cross ribs 14 at opposite ends thereof are constructed similarly to the ends 27 for seating upon said intermediate sills 10.

Arranged between the bows 11 and disposed crosswise therebetween are the spaced horizontal ribs 28 which lie about the ends and tip of the body A and afford roof rafters throughout the uppermost portion of said body while fixed to the vertical ribs or studding 18, top and bottom filler blocks 23 and 24, and ribs 28 throughout the sides, ends and top of the body A is ply boarding 29 of laminated material relatively thin and constitute the lining of the said body, this boarding being made secure in any suitable manner. The boarding 29 where overlapping the bows 11 is made secure thereto in any suitable manner. Also secured to the bows 11, studding 18, upper and lower filler blocks 23 and 24, spacer stripping 25 and the ribs 28 is outer ply boarding 30 while covering this boarding is aeroplane wing fabric 31 which is made secure in any suitable manner.

Arranged at the rear of the body A is a leaf spring saddle 32 which is made secure to the intermediate sills by clips 33 while through the medium of ribs 34 the said saddle 32 is secured to leaf springs 35 connected through shackles 36 which are adjustably connected at 37 with hangers 38 of an axle 39 supporting pneumatically tired wheels 40, these being covered at their upper portions by fenders or guards 41 built in the foundation of the body A. Arranged with the axle is a conventional truss 42 having universal fitting 43.

Arranged at the forward end of the body between the intermediate sills 10 is a draft rigging which comprises a tubular draft pole 44 slidably fitting the guide pieces 45 secured transversely between said intermediate sills 10 and through a suitable coupling (not shown). The forward end of this pole is attached to a draft vehicle for the hauling of the trailer vehicle. Fixed crosswise in the pole 44 are retaining bolts 46 while secured to the guides 45 are hook-like members 47 which are on opposite sides of the said pole and to these bolts and said hooks are fitted reversely acting groups of endless resilient or rubber bands 48 and 49, respectively, so that on displacement of the said pole 44 in reverse directions it will be placed under tension and in this manner shocks and jars incident to starting and stopping of the trailer will be absorbed by said bands 48 and 49 thereby relieving undue strain upon the trailer vehicle and avoiding vibration or jars imparted thereto during the travel of the vehicle through draft thereof.

Trained through the pole 44 is a safety coupling chain 50 which at the outer end thereof is adapted for attachment to the draft vehicle while the inner end is made secure at 51 to the foremost bolt 46 and this chain is normally slack when the pole 44 is attached to the draft vehicle and should this pole become unhitched or detached from the draft vehicle the safety coupling chain 50 will come into play in substitute therefor for continued draft of such trailer vehicle.

Attached to the pole 44 is a check chain 52 which is also secured at 53 to one of the guides 45 and the purpose of this chain is to limit the displacement of the pole 44 in reverse directions and thus avoiding the placing of excessive strain upon the bands 48 and 49 through shock absorbing action thereof.

At the forward end of the vehicle is built a compartment 54 having a door 55 and such compartment is for storage purposes.

At the forward end of the vehicle A is a bearing 55 for a swivel caster wheel 56 which serves for parking purposes of such trailer vehicle and also constitutes a forward support for the same while between the wheels 40 and the said caster wheel 56 and fitted with the vehicle A is a supplemental parking leg 57 which is susceptible of placement to augment the supporting of the vehicle when parked.

The ribs 28 at opposite ends are seated and fastened at 58 to the bows 11. These bows 11 are joined at their ends as at 59 and 60, respectively, to the foundation of the body A of such vehicle.

There are reinforcements 61 at the front ends of the sills 10 and 12 and these front ends of said sills are suitably joined with each other.

What is claimed is:

A vehicle of the kind described comprising a foundation including outer and intermediate sills each made from laminated wood throughout its extent, the outer sills for a major length thereof being parallel with each other, the intermediate sills being in convergent relation to each other in one direction, inwardly directed ends formed from the outer sills and approaching the intermediate sills at their ends next thereto, cross ribs arranged in spaced parallel relation to each other crosswise of the foundation between said sills, joint blocks of triangular shape in cross section disposed at opposite sides of the cross ribs and coextensive with the width thereof and permanently fastened to the sills, bottom planking above the sills and cross ribs and made fast thereto, wheel fenders built in the foundation and rising above the bottom planking and opening downwardly through said foundation, and strippings carried by the intermediate sills and providing seats below the uppermost edges thereof, the said cross ribs being engaged with said seats for disposition of the uppermost edges thereof flush with the upper edges of the intermediate sills.

JAMES E. OWEN.